(12) United States Patent
Xie et al.

(10) Patent No.: US 10,604,430 B2
(45) Date of Patent: Mar. 31, 2020

(54) MEMBRANE AERATED ANAEROBIC GRANULAR SLUDGE REACTOR WITH EFFICIENT NITROGEN REMOVAL AND GREENHOUSE GAS MITIGATION

(71) Applicant: HARBIN INSTITUTE OF TECHNOLOGY, Harbin (CN)

(72) Inventors: Guojun Xie, Harbin (CN); Shengqiang Fan, Harbin (CN); Nanqi Ren, Harbin (CN); Bingfeng Liu, Harbin (CN); Defeng Xing, Harbin (CN); Jie Ding, Harbin (CN)

(73) Assignee: HARBIN INSTITUTE OF TECHNOLOGY, Harbin (CN)

(*) Notice: Subject to any disclaimer, the term of this patent is extended or adjusted under 35 U.S.C. 154(b) by 0 days.

(21) Appl. No.: 16/228,911

(22) Filed: Dec. 21, 2018

(65) Prior Publication Data
US 2019/0202722 A1 Jul. 4, 2019

(30) Foreign Application Priority Data
Dec. 29, 2017 (CN) .......................... 2017 1 1472212

(51) Int. Cl.
*C02F 3/28* (2006.01)
*C02F 3/30* (2006.01)
*C02F 3/00* (2006.01)

(52) U.S. Cl.
CPC ............ *C02F 3/2853* (2013.01); *C02F 3/305* (2013.01); *C02F 3/006* (2013.01); *C02F 2209/02* (2013.01);
(Continued)

(58) Field of Classification Search
CPC .. C02F 3/2853; C02F 3/305; C02F 2209/225; C02F 2209/03; C02F 2209/02;
(Continued)

(56) References Cited

U.S. PATENT DOCUMENTS

| 2003/0057152 A1* | 3/2003 | Haridas | .................. C02F 3/282 |
| | | | 210/603 |
| 2010/0264079 A1* | 10/2010 | Begin | ................. C05F 17/0027 |
| | | | 210/603 |

(Continued)

*Primary Examiner* — Fred Prince
(74) *Attorney, Agent, or Firm* — IPro, PLLC

(57) ABSTRACT

The present invention discloses a novel membrane aerated anaerobic granular sludge reactor, belonging to the technical field of sewage treatment. The reactor solves the problems of low solubility of gas substances in an aqueous solution, large gas-liquid mass transfer resistance and low mass transfer rate. The top of a reactor body is provided with a water outlet, and the middle side wall of the reactor body is provided with a middle water outlet; the middle water outlet of the reactor body is connected with an water inlet of a membrane module; an water outlet of the membrane module is connected with a bottom water inlet of the reactor body through a circulating pump, a water inlet is connected with the bottom water inlet of the reactor body through a feed pump, a high pressure or pressurized gas cylinder outputs high pressure or pressurized gas to the membrane module, and a gas pressure regulating valve is arranged between the high pressure or pressurized gas cylinder and the membrane module. The novel membrane aerated anaerobic granular sludge reactor improves the content of a gas substrate therein, and shortens the formation time of granular sludge. The efficient nitrogen removal and greenhouse gas emission reduction method has higher nitrate and ammonia removal rates and a higher dissolved methane removal rate within a shorter time.

3 Claims, 1 Drawing Sheet

(52) U.S. Cl.
CPC .... *C02F 2209/03* (2013.01); *C02F 2209/225* (2013.01); *C02F 2305/06* (2013.01); *Y02E 50/343* (2013.01)

(58) Field of Classification Search
CPC .. C02F 2209/15; C02F 2209/14; C02F 3/307; C02F 3/2893; C02F 3/2833; Y02E 50/343; B01D 46/543
USPC ....... 210/603, 612, 615, 616, 617, 631, 150, 210/151, 903
See application file for complete search history.

(56) References Cited

U.S. PATENT DOCUMENTS

2015/0076059 A1\* 3/2015 Theodoulou .......... C02F 11/125
210/608
2017/0313608 A1\* 11/2017 Peterson ................ C02F 3/006

\* cited by examiner

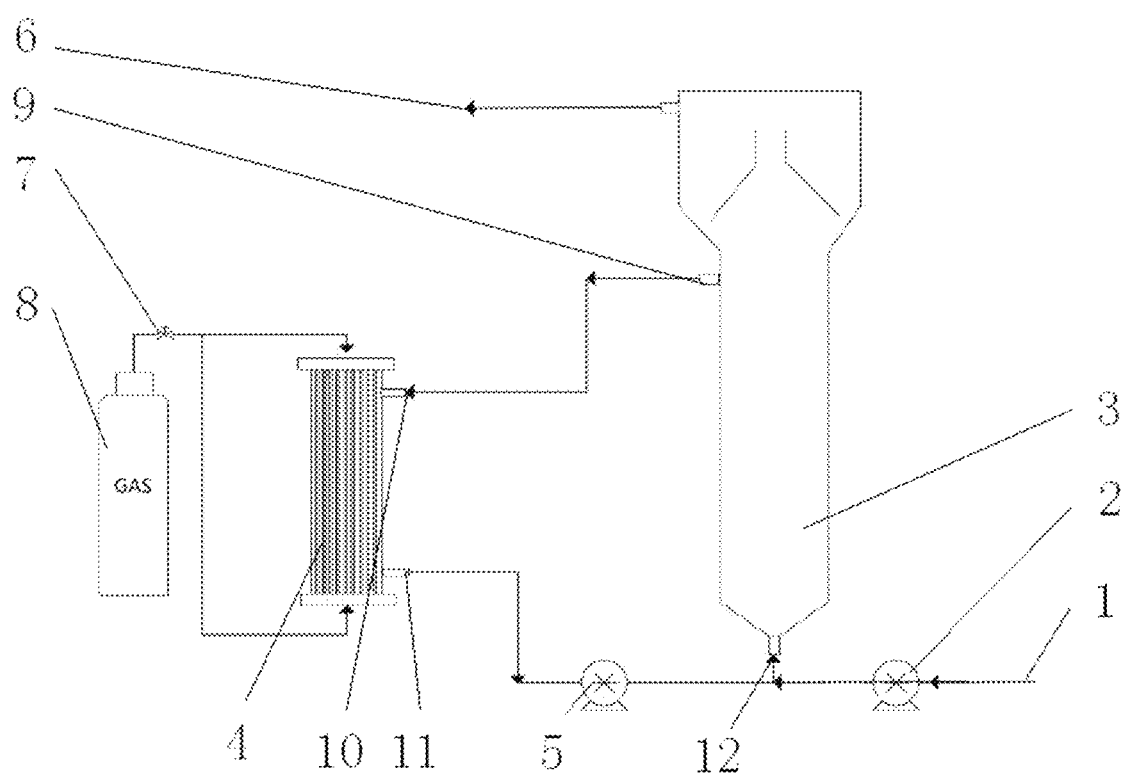

MEMBRANE AERATED ANAEROBIC GRANULAR SLUDGE REACTOR WITH EFFICIENT NITROGEN REMOVAL AND GREENHOUSE GAS MITIGATION

TECHNICAL FIELD

The present invention relates to a novel membrane aerated anaerobic granular sludge reactor and an method for efficient nitrogen removal and greenhouse gas emission reduction method, belonging to the technical field of wastewater treatment.

BACKGROUND ART

The continuous emission of greenhouse gases causes global warming, resulting in a series of environmental problems such as glaciers melting, sea level rise and frequent extreme weathers, which will cause serious, widespread and irreversible effects on humans and ecosystems. Methane is the second largest greenhouse gas in the world, its greenhouse effect is 28 times than that of carbon dioxide, its contribution to the atmospheric radiation intensity is more than 18%, and its impact on climate change is more significant than that of carbon dioxide. The anaerobic technology in the water treatment field is widely used worldwide because of low energy consumption, low sludge yield and the production of methane as renewable energy. However, the methane produced by the conventional anaerobic process is often present in the effluent of sewage treatment, and is released from the effluent to the atmosphere, thereby causing the greenhouse effect. At present, wastewater treatment plants have become one of the important emission sources of methane worldwide.

Anaerobic ammonia oxidation (Anammox) and denitrifying anaerobic methane oxidation (DAMO) are the latest discovery in the field of biological nitrogen cycle. DAMO microorganisms include DAMO bacteria and DAMO archaea, which are autotrophic microorganisms using methane as electron donors. DAMO archaea convert nitrate into nitrite, and the DAMO bacteria reduce the nitrite into nitrogen Anammox microorganisms can generate nitrogen and nitrate by means of nitrite and ammonium. Therefore, the coupling of the DAMO microorganisms and the Anammox microorganisms provides a new opportunity for efficient simultaneous nitrogen and methane removal, is also a key link of the carbon and nitrogen cycle, and provides a new idea and choice for methane emission reduction and nitrogen pollution treatment.

However, the DAMO and Anammox microorganisms grow very slowly, with a doubling time from 11 to 30 days, and the accumulation of biomass takes a long time. In the current research, the DAMO and Anammox microorganisms mostly present in the form of flocculent sludge, the settling performance of floc is poor, and the functional microorganisms are easily washout, so the DAMO and Anammox microorganisms are hardly applied to the practice.

Moreover, methane is regarded as a carbon source for the growth of the DAMO microorganisms, while the solubility of the methane in water is less than 22 mg/L under normal temperature and pressure conditions, it is difficult to ensure sufficient methane supply for the growth of the DAMO microorganisms and the denitrification for nitrogen removal, and the gas-liquid mass transfer rate is low, resulting in slow cell growth and slow biosynthesis, which greatly limits the large-scale application of the DAMO microorganisms.

SUMMARY OF THE INVENTION

The present invention provides a novel membrane aerated anaerobic granular sludge reactor to solve the problems of low solubility of gas substances in an aqueous solution, large gas-liquid mass transfer resistance and low mass transfer rate. Membrane aeration enable gas delivery by diffusion through the membrane wall into the bulk liquid without bubble formation, thus lowering mass transfer resistance and enhancing mass transfer efficiency. The gas transfer can be safely controlled by the gas partial pressure and the membrane surface area. The present invention provides an efficient nitrogen removal and greenhouse gas emission reduction method to solve the problems of cost increase caused by a large amount of external carbon sources for achieving efficient nitrogen removal in the conventional anaerobic process and greenhouse effect caused by a large amount of methane emission to the atmosphere.

In order to achieve the above objectives, the technical scheme adopted by the novel membrane aerated anaerobic granular sludge reactor according to the present invention is achieved as follows:

A novel membrane aerated anaerobic granular sludge reactor comprises a feed pump, a reactor body, a membrane module, a circulating pump, and a high pressure or pressurized gas cylinder, where in the top of the reactor body is cylindrical, the diameter of the top of the reactor body is larger than that of the middle of the reactor body, the joint of the top of the reactor body and the middle of the reactor body is in a circular truncated cone shape, and the bottom of the reactor body is conical;

the bottom of the reactor body is provided with a bottom water inlet, the top of the reactor body is provided with a water outlet, and the middle side wall of the reactor body is provided with a middle air outlet;

the membrane module is provided with an water inlet and an water outlet, and the middle water outlet of the reactor body is connected with the gas inlet of the membrane module;

the water outlet of the membrane module is connected with the bottom water inlet of the reactor body through the circulating pump, a water inlet is connected with the bottom water inlet of the reactor body through the feed pump, the high pressure or pressurized gas cylinder outputs gas to the membrane module, and a gas pressure regulating valve is arranged between the high pressure or pressurized gas cylinder and the membrane module.

Further, the gas in the gas cylinder is a high pressure or pressurized mixed gas of 95% of methane and 5% of carbon dioxide.

An efficient nitrogen removal and greenhouse gas emission reduction method using the novel membrane aerated anaerobic granular sludge reactor comprises the following steps:

(a) inoculating in the novel membrane aerated anaerobic granular sludge reactor, i.e., putting enriched flocculent sludge containing denitrifying anaerobic methane oxidation bacteria, denitrifying anaerobic methane oxidation archaea and anaerobic ammonia oxidation functional microorganisms, and anaerobic granular sludge into the reactor, and regulating the concentrations of nitrate and ammonium in the reactor by adding nitrate concentrate and ammonium concentrate in proportion to the volume of the novel membrane aerated anaerobic granular sludge reactor into the novel membrane aerated anaerobic granular sludge reactor, the concentrations of the nitrate and ammonium in the reactor being respectively improved by 25 mg-N/L by 1 ml of nitrate and ammonium concentrates; controlling the pressure of high pressure or pressurized mixed gas of 95% of methane and 5% of carbon dioxide by the gas pressure regulating valve, and connecting the high pressure or pressurized mixed gas to the membrane aeration device, the high pressure or pressurized mixed gas being rapidly dissolved into the liquid phase of the anaerobic granular sludge reactor through the membrane module to provide a growth substrate for the denitrifying anaerobic methane oxidation microorganisms;

(b) denitrifying anaerobic methane oxidation archaea in the granular sludge covert nitrate into nitrite by using the dissolved methane generated by membrane aeration as electron donors. The nitrite produced by DAMO archaea for the anaerobic ammonia oxidation and denitrifying anaerobic methane oxidation bacteria in the granular sludge to use; reducing, by the denitrifying anaerobic methane oxidation bacteria, the nitrite into nitrogen by using methane as a reducing agent; generating, by the anaerobic ammonia oxidation microorganisms, nitrate and nitrogen by using the ammonium salts and the nitrite, wherein the nitrate generated in the anaerobic ammonia oxidation process can be used by the denitrifying anaerobic methane oxidation archaea;

(c) controlling the operating temperature of the novel membrane aerated anaerobic granular sludge reactor to −35° C., maintaining the pH value at 7.0-8.0, controlling the gas pressure in the novel membrane aerated anaerobic granular sludge reactor to 0.02-0.1 MPa, taking a liquid phase sample from the novel membrane aerated anaerobic granular sludge reactor every day, detecting the sample to obtain the concentrations of nitrate and ammonia in the novel membrane aerated anaerobic granular sludge reactor, and when the concentration of nitrate is less than 100 mg-N/L, adding nitrate and ammonium concentrates to the reactor to restore the concentration of nitrate in the reactor to 300 mg-N/L or more;

(d) after the novel membrane aerated anaerobic granular sludge reactor is operated for 50 days, enriching the denitrifying anaerobic methane oxidation bacteria and the anaerobic ammonia oxidation bacteria that have gradually become dominant strains in the system, wherein the functional microorganisms in the novel membrane aerated anaerobic granular sludge reactor are mainly present in the form of flocculent sludge, at this time, the consumption rate of the nitrate can reach about 90 mg-N/L/day and the consumption rate of the ammonia is about 60 mg-N/L/day, and the removal effect of the dissolved methane can reach 42 mg/L/day;

(e) after the reactor is operated for 100 days, granulating the sludge rich in denitrifying anaerobic methane oxidation bacteria and anaerobic ammonia oxidation bacteria to form mostly circular or elliptic sludge that is obvious in regular shapes and has the grain diameter of 500-1000 μm in the novel membrane aerated anaerobic granular sludge reactor, wherein at this time, the consumption rate of the nitrate can reach about 140 mg-N/L/day and the consumption rate of the ammonia is 200 mg-N/L/day, and the removal effect of the dissolved methane can reach about 95 mg/L/day; and (f) after 100 days of continuous operation, the grain diameter of the sludge becoming larger, granular sludge having been formed, the grain diameter of the sludge being 800-2000 μm, the consumption rates of the nitrate and the ammonia being significantly increased, the final consumption rate of the nitrate reaching 400 mg-N/L/day or more, the consumption rate of the ammonia reaching 300 mg-N/L/day or more, the removal effect of the dissolved methane in water reaching about 170 mg/L/day or more, the nitrate and ammonium removal rate of the novel membrane aerated anaerobic granular sludge reactor being enhanced, the tolerant concentration of the nitrate reaching 800 mg-NIL or more, and the tolerant concentration of the ammonium reaching 800 mg-NIL or more.

The novel membrane aerated anaerobic granular sludge reactor according to the present invention solves the problems of low solubility of gas substances in an aqueous solution, large gas-liquid mass transfer resistance and low mass transfer rate; and the efficient nitrogen removal and greenhouse gas emission reduction method according to the present invention solves the problems of cost increase caused by a large amount of external carbon sources for achieving the purpose of efficient nitrogen removal in the conventional anaerobic process and greenhouse effect caused by emitting a large amount of methane generated to the atmosphere.

The novel membrane aerated anaerobic granular sludge reactor according to the present invention has the beneficial effects: granular sludge is combined with membrane aeration together, on one hand, gas is provided for the granular sludge by the membrane aeration, the gas is directly dissolved in the reaction system by the membrane aeration, and the gas supply pressure is regulated to break through the gas-liquid mass transfer resistance, realize efficient gas-liquid mass transfer and greatly reduce the limitations caused by insufficient gas supply; and on the other hand, the granular sludge has relatively good sludge-water separation ability and higher bio-reactor unit treatment ability, can bear higher impact load, and has the advantages of simultaneously removing organic matters and nitrogen and phosphorus nutrients and the like. The novel membrane aerated anaerobic granular sludge reactor according to the present invention could be widely applied to various gases, and may be an anaerobic granular sludge reactor, an inner circulation anaerobic reactor, an up-flow anaerobic sludge blanket reactor, etc. The efficient nitrogen removal and greenhouse gas emission reduction method according to the present invention realizes efficient mass transfer of methane from the gas phase to the liquid phase by utilizing the membrane aeration, and cultures anaerobic granular sludge containing DAMO and Anammox as functional microorganisms in the reactor. The granular sludge functional microorganisms have relatively good sedimentation performance and high bio-retention efficiency, effectively avoid the loss of biomass, provide a good growth environment for slow-growing DAMO and Anammox functional microorganisms, achieves the purpose of efficient nitrogen removal using the dissolved methane in water as a carbon source without additional carbon sources, meanwhile the dissolved methane is removed to avoid the greenhouse effect caused by methane emissions.

BRIEF DESCRIPTION OF THE DRAWING

FIG. 1 is a structure diagram of a novel membrane aerated anaerobic granular sludge reactor according to the present invention.

In the drawings: water inlet 1, feed pump 2, reactor body 3, membrane module 4, circulating pump 5, water outlet 6, gas pressure regulating valve 7, high pressure or pressurized gas cylinder 8, middle water outlet 9, water inlet 10, water outlet 11, bottom water inlet 12.

DETAILED DESCRIPTION OF THE INVENTION

Embodiment 1 is described in combination with FIG. 1. A novel membrane aerated anaerobic granular sludge reactor according to the present embodiment includes a feed pump 2, a reactor body 3, a membrane module 4, a circulating pump 5, a gas pressure regulating valve 7 and a high pressure or pressurized gas cylinder 8.

The top of the reactor body 3 is cylindrical, the diameter of the top of the reactor body 3 is greater than that of the middle of the reactor body 3, the joint of the top of the reactor body 3 and the middle of the reactor body 3 is in a circular truncated cone shape, and the bottom of the reactor body 3 is conical.

The bottom of the reactor body 3 is provided with a bottom water inlet 12, the top of the reactor body 3 is provided with a water outlet 6, and the middle side wall of the reactor body 3 is provided with a middle water outlet 9.

The membrane module 4 is provided with a water inlet 10 and a water outlet 11, and the middle water outlet 9 of the reactor body 3 is connected with the water inlet 10 of the membrane module 4.

The water outlet 11 of the membrane module 4 is connected with the bottom water inlet 12 of the reactor body 3 through the circulating pump 5, a water inlet 1 is connected with the bottom water inlet 12 of the reactor body 3 through the feed pump 2, the high pressure or pressurized gas cylinder 8 outputs high pressure or pressurized gas to the membrane module 4, and the gas pressure regulating valve 7 is arranged between the high pressure or pressurized gas cylinder 8 and the membrane module 4.

With the novel membrane aerated anaerobic granular sludge reactor according to the present embodiment, fed water enters from the bottom of the reactor body 3 through the feed pump 2, the middle water outlet 9 of the reactor body 3 is connected to the water inlet 10 of the membrane module 4, the water outlet 11 of the membrane module 4 is connected to the inlet end of the circulating pump 5, and the outlet end of the circulating pump 5 is connected to the bottom water inlet 12 of the reactor body 3. The water inlet 10 and the water outlet 11 of the membrane module 4 are connected to the gas pressure regulating valve 7 and then connected to the high pressure or pressurized gas cylinder 8. High-pressure methane and carbon dioxide in the high pressure or pressurized gas cylinder are rapidly dissolved into the liquid in a membrane aeration manner in the membrane module 4, this portion of liquid enters the reactor body 3 under the circulation of the circulating pump 5, and the dissolved gas in the solution is utilized by the granular sludge and then recycled to the membrane module 4. In the membrane module 4, methane is dissolved into the liquid again by membrane aeration, the liquid in which a large amount of methane is dissolved enters the reactor body 3 through the circulating pump 5, the process is circulated in such a manner, and the liquid is discharged from the water outlet 6.

Embodiment 2 is described with reference to FIG. 1. The present embodiment further defines the novel membrane aerated anaerobic granular sludge reactor described in embodiment 1. In the present embodiment, the gas in the high pressure or pressurized gas cylinder 8 is a high pressure or pressurized mixed gas of 95% of methane and 5% of carbon dioxide.

Embodiment 3 is described in combination with FIG. 1. A reaction method using the novel membrane aerated anaerobic granular sludge reactor according to the present embodiment includes the following steps:

(a) inoculating in the novel membrane aerated anaerobic granular sludge reactor, i.e., putting enriched flocculent sludge containing denitrifying anaerobic methane oxidation bacteria, denitrifying anaerobic methane oxidation archaea and anaerobic ammonia oxidation functional microorganisms, and anaerobic granular sludge into the reactor, and regulating the concentrations of nitrate and ammonium in the reactor by adding a nitrate concentrate and an ammonium concentrate in proportion to the volume of the novel membrane aerated anaerobic granular sludge reactor into the novel membrane aerated anaerobic granular sludge reactor, the concentrations of the nitrate and the ammonium in the reactor being respectively improved by 25 mg-NIL by 1 ml of nitrate and ammonium concentrates; controlling the pressure of high pressure or pressurized mixed gas of 95% of methane and 5% of carbon dioxide by the gas pressure regulating valve 7, and connecting the high pressure or pressurized mixed gas to the membrane aeration device, the high pressure or pressurized mixed gas being rapidly dissolved into the liquid phase of the anaerobic granular sludge reactor through the membrane module 4 to provide a growth substrate for the denitrifying anaerobic methane oxidation microorganisms;

(b) reducing, by the denitrifying anaerobic methane oxidation archaea in the granular sludge, the nitrate into nitrite by using the dissolved methane generated by membrane aeration as electron donors, for the anaerobic ammonia oxidation and denitrifying anaerobic methane oxidation bacteria in the granular sludge to use; reducing, by the denitrifying anaerobic methane oxidation bacteria, the nitrite into nitrogen by using methane as a reducing agent; generating, by the anaerobic ammonia oxidation microorganisms, nitrate and nitrogen by using the ammonium and the nitrite, wherein the nitrate generated in the anaerobic ammonia oxidation process can be used by the denitrifying anaerobic methane oxidation archaea;

(c) controlling the operating temperature of the novel membrane aerated anaerobic granular sludge reactor to 30-35° C., maintaining the pH value at 7.0-8.0, controlling the gas pressure in the novel membrane aerated anaerobic granular sludge reactor to 0.02-0.1 MPa, taking a liquid phase sample from the novel membrane aerated anaerobic granular sludge reactor every day, detecting the sample to obtain the concentrations of nitrate and ammonia in the novel membrane aerated anaerobic granular sludge reactor, and when the concentration of nitrate is less than 100 mg-N/L, adding nitrate and ammonium salt concentrates to the reactor to restore the concentration of nitrate in the reactor to 300 mg-N/L or more;

(d) after the novel membrane aerated anaerobic granular sludge reactor is operated for 50 days, enriching the denitrifying anaerobic methane oxidation microorganisms and the anaerobic ammonia oxidation bacteria that have gradually become dominant strains in the system, wherein the functional microorganisms in the novel membrane aerated anaerobic granular sludge reactor are mainly present in the form of flocculent sludge, at this time, the consumption rate of the nitrate can reach about 90 mg-N/L/day and the consumption rate of the ammonia is 60 mg-N/L/day, and the removal effect of the dissolved methane can reach 42 mg/L/day;

(e) after the reactor is operated for 100 days, granulating the sludge rich in denitrifying anaerobic methane oxidation microorganisms and anaerobic ammonia oxidation bacteria to form mostly circular or elliptic sludge that is obvious in regular shapes and has the grain diameter of 500-1000 nm in the novel membrane aerated anaerobic granular sludge reactor, wherein at this time, the consumption rate of the nitrate can reach about 140 mg-N/L/day and the consumption rate of the ammonia is 200 mg-N/L/day, and the removal effect of the dissolved methane can reach about 95 mg/L/day; and (f) after 100 days of continuous operation, the diameter of the sludge becoming larger, granular sludge having been formed, the grain diameter of the sludge being 800-2000 μm, the consumption rates of the nitrate and the ammonia being significantly increased, the final consumption rate of the nitrate reaching 400 mg-N/L/day or more, the consumption rate of the ammonia reaching 300 mg-N/L/day or more, the removal effect of the dissolved methane in water reaching about 170 mg/L/day or more, the nitrate and ammonium removal rate of the novel membrane aerated anaerobic granular sludge reactor being enhanced, the tolerant concentration of the nitrate reaching 800 mg-N/L or more, and the tolerant concentration of the ammonium reaching 800 mg-N/L or more.

The efficient nitrogen removal and greenhouse gas emission reduction method according to the present embodiment successfully combines the characteristics of membrane aeration and granular sludge, successfully cultures granular sludge taking DAMO and Anammox as main functional microorganisms within a shorter time, and has higher nitrate and ammonia removal rates and a higher dissolved methane removal rate.

The structure of the novel membrane aerated anaerobic granular sludge reactor according to the present invention is not limited to the specific structure described in each above embodiment, and may also be a reasonable combination of the features described in the above embodiments.

What is claimed is:

1. A novel membrane aerated anaerobic granular sludge reactor, comprising a feed pump, a reactor body, a membrane module, a circulating pump, a gas pressure regulating valve and a pressurized gas cylinder, wherein a top of the reactor body is cylindrical, a diameter of the top of the reactor body is greater than that of a middle of the reactor body, a joint of the top of the reactor body and the middle of the reactor body is in a circular truncated cone shape, and a bottom of the reactor body is conical;

wherein the bottom of the reactor body is provided with a bottom water inlet, the top of the reactor body is provided with a water outlet, and a middle side wall of the reactor body is provided with a middle water outlet;

wherein the membrane module is provided with a water inlet and a water outlet, and the middle water outlet of the reactor body is connected with the water inlet of the membrane module;

wherein the water outlet of the membrane module is connected with the bottom water inlet of the reactor body through the circulating pump, a water inlet is connected with the bottom water inlet of the reactor body through the feed pump, the pressurized gas cylinder outputs pressurized gas to the membrane module, and the gas pressure regulating valve is arranged between the pressurized gas cylinder and the membrane module.

2. The novel membrane aerated anaerobic granular sludge reactor of claim 1, wherein gas in the pressurized gas cylinder is a pressurized mixed gas of 95% of methane and 5% of carbon dioxide.

3. A method for efficient nitrogen removal and greenhouse gas mitigation using the novel membrane aerated anaerobic granular sludge reactor of claim 1, comprising the following steps:

(a) inoculating in the novel membrane aerated anaerobic granular sludge reactor by putting enriched flocculent sludge containing denitrifying anaerobic methane oxidation bacteria, denitrifying anaerobic methane oxidation archaea and anaerobic ammonia oxidation functional microorganisms, and anaerobic granular sludge into the reactor, and regulating concentrations of nitrate and ammonium in the reactor by adding nitrate concentrate and ammonium concentrate in proportion to volume of the novel membrane aerated anaerobic granular sludge reactor into the novel membrane aerated anaerobic granular sludge reactor, concentrations of the nitrate and the ammonium in the reactor being respectively improved by 25 mg-N/L by 1 ml of nitrate and ammonium concentrates; controlling pressure of pressurized mixed gas of 95% of methane and 5% of carbon dioxide by a gas pressure regulating valve, and connecting the pressurized mixed gas to a membrane aerated device, the pressurized mixed gas being rapidly dissolved into a liquid phase of the anaerobic granular sludge reactor through the membrane module to provide a growth substrate for the denitrifying anaerobic methane oxidation microorganisms;

(b) reducing, by the denitrifying anaerobic methane oxidation archaea in the granular sludge, the nitrate into nitrite by using a dissolved methane generated by membrane aerated as electron donors, for the anaerobic ammonia oxidation and denitrifying anaerobic methane oxidation bacteria to use; reducing, by the denitrifying anaerobic methane oxidation bacteria, the nitrite into nitrogen by using methane as a reducing agent; generating, by the anaerobic ammonia oxidation microorganisms, nitrate and nitrogen by using ammonium and the nitrite; wherein nitrate generated in the anaerobic ammonia oxidation process is capable of being used by the denitrifying anaerobic methane oxidation archaea;

(c) controlling operating temperature of the novel membrane aerated anaerobic granular sludge reactor to 30-352° C., maintaining pH value at 7.08, controlling gas pressure in the novel membrane aerated anaerobic granular sludge reactor to 0.02-0.1 MPa, taking a liquid phase sample from the novel membrane aerated anaerobic granular sludge reactor every day, detecting the sample to obtain a concentrations of nitrate and ammonia in the novel membrane aerated anaerobic granular sludge reactor, and when the concentration of nitrate is less than 100 mg-N/L, adding nitrate and ammonium concentrates to the reactor to keep the concentration of nitrate in the reactor to 300 mg-N/L or more;

(d) after the novel membrane aerated anaerobic granular sludge reactor is operated for 50 days, enriching the denitrifying anaerobic methane oxidation bacteria and anaerobic ammonia oxidation bacteria that have gradually become dominant strains in a system, wherein the functional microorganisms in the novel membrane aerated anaerobic granular sludge reactor mainly exist in the form of flocculent sludge, at this time, consumption rate of the nitrate is capable of reaching about 90 mg-N/L/day and consumption rate of the ammonia is 60 mg-N/L/day, and removal effect of the dissolved methane is capable of reaching 42 mg/L/day;

(e) after the reactor is operated for 100 days, starting to granulate sludge containing denitrifying anaerobic methane oxidation bacteria and anaerobic ammonia oxidation bacteria to form mostly circular or elliptic sludge that is obvious in regular shapes and has a grain diameter of 500-1000 μm in the novel membrane aerated anaerobic granular sludge reactor, wherein at this time, the consumption rate of the nitrate is capable of reaching about 1240 mg-N/L/day and the consumption rate of the ammonia is 200 mg-N/L/day, and the removal effect of the dissolved methane is capable of reaching about 95 mg/L/day; and (f) after 100 days of continuous operation, a grain diameter of the sludge becoming larger, granular sludge having been formed, the grain diameter of the sludge reaching 800-2000 μm, the consumption rates of the nitrate and the ammonia being significantly increased, a final consumption rate of the nitrate reaching 400 mg-N/L/day or more, the consumption rate of the ammonia reaching 300 mg-N/L/day or more, removal effect of the dissolved methane in water reaching about 170 mg/L/day or more, nitrate and ammonium carrying capacity of the novel membrane aerated anaerobic granular sludge reactor being enhanced, tolerant concentration of the nitrate reaching 800 mg-N/L or more, and a tolerant concentration of the ammonium reaching 800 mg-N/L or more.

* * * * *